United States Patent [19]

Broucksou

[11] 4,195,535

[45] Apr. 1, 1980

[54] POSITIONING DEVICE FOR A VEHICLE STEERING COLUMN

[75] Inventor: Robert H. Broucksou, Danville, Ky.

[73] Assignee: Eaton Corporation, Cleveland, Ohio

[21] Appl. No.: 871,658

[22] Filed: Jan. 23, 1978

[51] Int. Cl.² .......................... B62D 1/18; G05G 5/16
[52] U.S. Cl. ........................................ 74/493; 74/531; 403/109; 403/374
[58] Field of Search .................. 74/493, 531; 403/109, 403/374

[56] References Cited

U.S. PATENT DOCUMENTS

| | | | |
|---|---|---|---|
| 2,643,143 | 6/1953 | Bergqvist | 403/374 X |
| 2,902,736 | 9/1959 | Hampe | 403/374 X |
| 3,491,614 | 1/1970 | Saunders et al. | 74/531 X |
| 3,533,302 | 10/1970 | Hansen | 74/493 |
| 3,570,322 | 3/1971 | Krouse | 74/493 |
| 3,955,439 | 5/1976 | Meyer | 74/493 |
| 3,977,692 | 8/1976 | Findley | 74/493 X |
| 4,075,903 | 2/1978 | Cornell | 74/493 |

FOREIGN PATENT DOCUMENTS 1438508   6/1976   United Kingdom ...................... 74/493

*Primary Examiner*—Allan D. Herrmann
*Attorney, Agent, or Firm*—R. J. McCloskey; F. M. Sajovec, Jr.

[57] ABSTRACT

An adjustable support structure for a motor vehicle steering column. The steering column is attached to a first tube which is telescopically received within a second tube attached to the vehicle frame. A releasable wedge member acts between the two tubes to lock the steering column in any one of an infinite number of positions within a selected adjustment range.

10 Claims, 6 Drawing Figures

POSITIONING DEVICE FOR A VEHICLE STEERING COLUMN

This invention relates generally to adjustable steering columns, and more particularly to an adjustable support for a steering column which is mounted to be movable along a single axis.

In commercial vehicles it is often desirable that the steering wheel and steering column remain in substantially the same orientation while being adjusted to various positions relative to the vehicle dashboard or frame. One type of prior art device for adjusting the position of a steering column and wheel assembly is shown in U.S. Pat. No. 3,678,778, issued to Donald W. Groves on July 25, 1972, which discloses a structure providing incremental adjustment. Another type of device, as shown by U.S. Pat. No. 3,977,692, issued to Samuel A. Findley et al on Aug. 31, 1976, discloses a device which provides infinite variation of the position of a steering column.

In general, the above types of adjustable steering columns have certain drawbacks. The type which provides incremental adjustment generally includes a simple locking mechanism to secure the column in a desired position; however, an optimum column position is often found to be between incremental stops of the adjusting mechanism. Adjusting mechanisms of the infinitely variable type provide the desired flexibility; however, the locking mechanism can be complex, and thus costly and subject to malfunction.

It is thus an object of the present invention to provide an infinitely variable mechanism for adjusting the position of a steering column and wheel assembly which includes a relatively simple mechanism for effecting the adjustment and for locking the column in a selected adjusted position.

Another object of the invention is to provide an adjustable steering column as above which includes a simple locking mechanism which is adaptable for use with a variety of mechanisms for selectively releasing and reengaging the locking mechanism to effect adjustment of the steering column.

To meet the above objectives the present invention provides a steering column support comprising an inner tube and an outer tube, both of substantially rectangular cross section. A wedge surface is formed along a portion of one corner of the inner tube by effectively removing, either by cutting or by forming, adjacent walls of a portion of the tube at equal angles from a predetermined point on the adjacent corner and replacing the removed portion with a bearing plate in the form of an isosceles triangle. A separate wedge member fits into the cutaway portion of the inner tube and bears against the triangular surface of the inner tube and adjacent inner walls of the outer tube. Spring means are provided to draw the wedge member inward, the interaction of the triangular bearing surface and the corresponding surface of the wedge member forcing the wedge member into the inner corner of the outer tube to frictionally lock the inner and outer tubes together.

In accordance with one aspect of the invention a lug projecting from the wedge member extends through a hole formed in the triangular surface. A rod received in the lug extends within the inner tube generally along its longitudinal axis and is connected at its opposite end to a mechanism for moving the rod axially. Thus, the wedge member can be disengaged by axial movement of the rod.

Other objects and advantages of the invention will become more apparent from the following description when taken in connection with the accompanying drawings, wherein.

Figure 1:
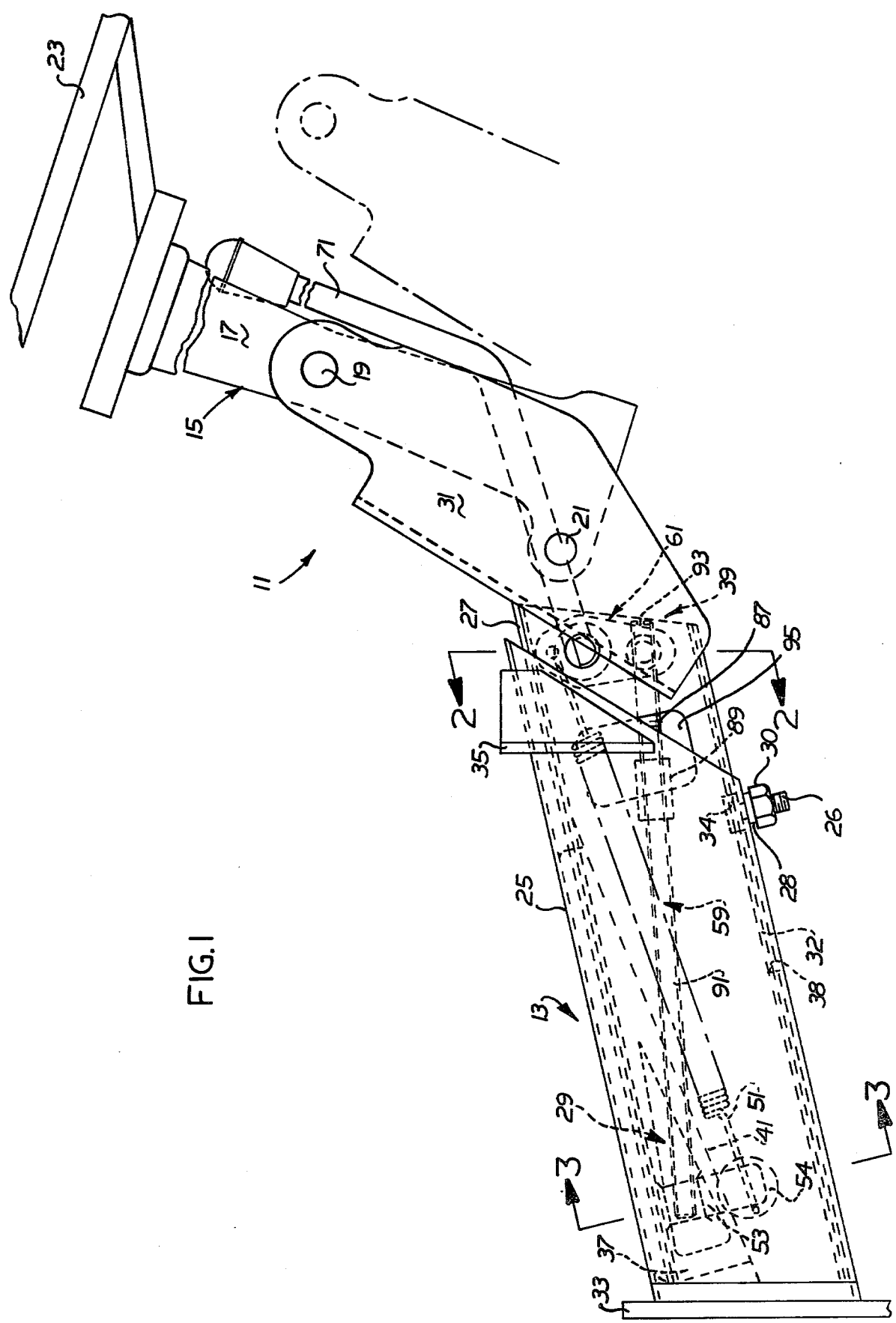
FIG. 1 is a side elevation view of a steering column support assembly incorporating the invention.

Referring to FIG. 1 there is illustrated a steering column assembly 11, of the type generally used in trucks. The steering column assembly comprises a support assembly 13 which is attached to the truck frame, and a steering column 15. The steering column is conventional, comprising a column member 17 attached to the support assembly by pinning or the like at 19 and 21, and a steering wheel 23 rotatably mounted on the end of the steering column and attached to the truck steering gear by appropriate shafts and joints and the like. The steering column itself forms no part of the present invention and will not be described further herein.

Figure 2:
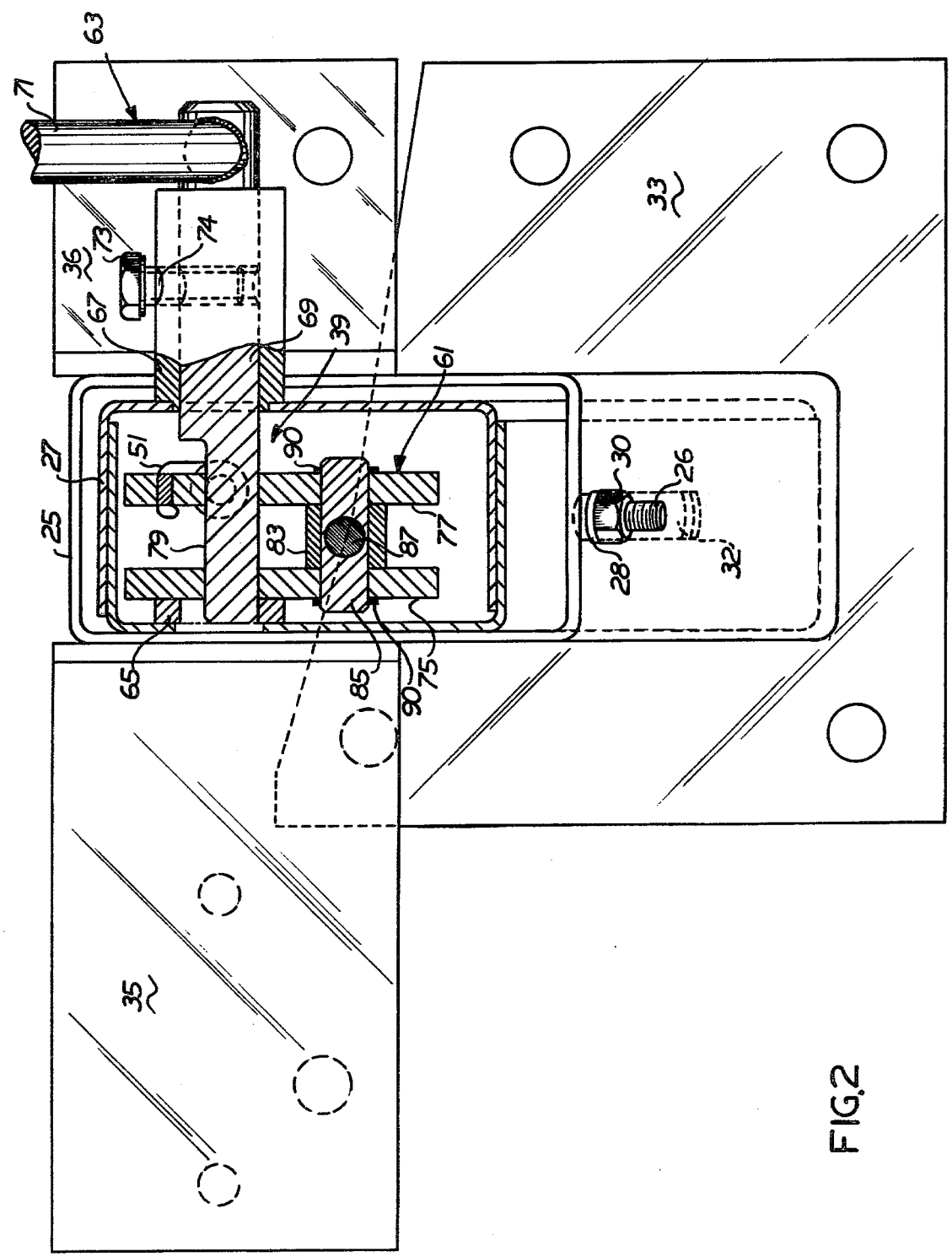
FIG. 2 is a sectional view taken along line 2—2 of FIG. 1.

The support assembly 13 comprises an outer tube 25, an inner tube 27, a wedge lock assembly 29 acting between the inner and outer tubes, and a column support member 31 which is welded or otherwise fastener to the inner tube, and to which the steering column 15 is attached. Referring to FIG. 2, brackets 33, 35 and 36 are welded or otherwise fastened to the outer tube 25 for attachment to suitable frame members of the vehicle.

Figure 3:
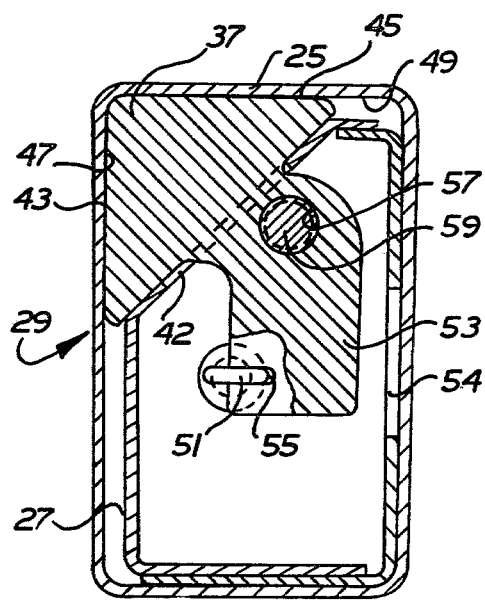
FIG. 3 is a sectional view taken along line 3—3 of FIG. 1.

In the illustrative embodiment the outer tube 25 is a single piece rectangular tube, while the inner tube is formed of two generally "C"-shaped members welded together as shown in FIGS. 2 and 3. The column support 31 is also a "C"-shaped member, and is welded to the end of the inner channel 27 in the attitude shown. The steering column 15 is received within the arms of the "C", and pinned thereto at 19 and 21 as mentioned above.

The inner tube 27 is slidable within the outer tube 25 to provide about four inches of steering column adjustment from the innermost position shown in full line in FIG. 1 to the broken line position. The column support assembly 13 is locked in any of an infinite number of positions within this adjustment range by means of the wedge lock assembly 29. A bolt 26 is received in a hole formed in the bottom of the outer tube 25 and is fixed thereto by means of a lockwasher 28 and a nut 30. The head of the bolt 26 is received in a slot 32 formed in the inner tube 27, the length of the slot defining the range of adjustment.

Figure 4:
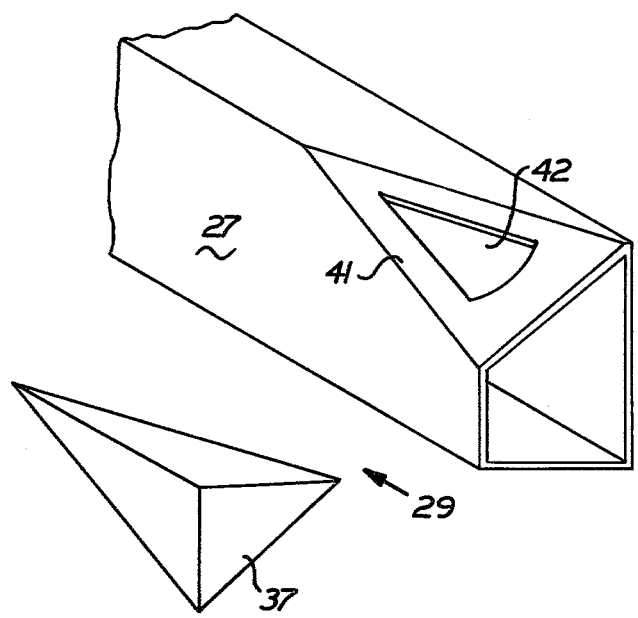
FIG. 4 is a fragmentary exploded view schematically representing the locking wedge structure of the invention.

Referring particularly to FIGS. 2, 3 and 4, the wedge lock assembly 29 comprises a wedge member 37 acting between the inner and outer tubes, and a wedge release assembly designated generally by the numeral 39. To accommodate the wedge member 37, the front corner portion of the inner tube 27 is formed as shown in FIG.

4, either by a forming operation, or by cutting away material and welding in a plate, leaving a triangular bearing plate 41 in place of one of the front corner portions of the inner tube 27. An aperture 42 is formed in the bearing plate 41.

The wedge member 37, which is shown as a solid cast or powdered metal part in the illustrated embodiment, is shaped and sized generally to replace the corner portion removed from the inner tube 27, and thus is complimentary to the remaining portion of the inner tube. The inner and outer tubes are locked together by drawing the wedge member 37 up the bearing plate to force the outer sides 43 and 45 of the wedge member 37 into respective engagement with the adjacent inner sides 47 and 49 of the outer tube 25.

The wedge member 37 is normally held in a locked position, i.e., pulled up along the bearing plate 41, by means of an expansion spring 51 acting between the wedge member and the wedge release assembly 39.

The wedge member 37 has a downwardly directed projection or lug 53 formed thereon which extends through the aperture 42 formed in the bearing plate 41. A small hole 55 is formed in lug 53 to receive one end of the spring 51. A second, tapped hole 57 is formed in the lug 53 to receive one end of a wedge unlocking bar 59, which is part of the wedge release assembly 39. A hole 54 is formed in one wall of the inner tube 27 to facilitate attachment of the spring 51 to the lug 53.

Referring particularly to FIGS. 1 and 2, the wedge release assembly 39 comprises the unlocking bar 59, a release arm assembly 61 to which the opposite end of the unlocking bar 59 is attached, and an actuating handle assembly 63 which is journaled for rotation in the inner tube 27, and attached to the release arm assembly 61. The actuating handle assembly comprises a first bearing 65 received in a hole formed in one side of inner tube 27, and welded or otherwise fixed thereto; a second bearing 67 received in a hole formed in the opposite side of the inner tube 27, and welded or otherwise fixed thereto to extend outward therefrom; a shaft 69, to which the release arm assembly 61 is attached, received in the bearings 65 and 67 and extending outward beyond bearing 67; and an actuating lever 71, which extends from the shaft 69 at substantially a right angle to the axis thereof. The shaft 69 is located axially by means of a bolt 73, which is received through a slot 74 formed in the bearing 67 and threaded into the shaft 69. The slot 74 serves to limit the angular movement of the shaft 69.

The release arm assembly 61 comprises first and second substantially identical arm members 75 and 77 having "D"-shaped holes formed therein to fit over a corresponding "D"-shaped section 79 formed on a portion of the shaft 69. A hole is formed through arm 77 on one side of shaft 69 to receive one end of spring 51. A spacer 83 is received between the arms 75 and 77 over a trunnion 85 extending through holes formed in the arms. The trunnion has a threaded cross hole formed therein to receive a threaded end 87 of the bar 59, the bar extending through the trunnion and through corresponding holes formed in the spacer 83. The trunnion 87 is held in place by snap rings 90.

The unlocking bar 59 is formed of two rod sections connected by an adjusting spacer 89. The first rod section 91 is threaded at one end and screwed into the lug 53, and the opposite end is welded or otherwise fixed to one end of the spacer 89. The second rod section 87 is screwed into the trunnion 85 at one end as described above, and into the other end of the spacer 89 at the other end. A screw slot 93 is formed in the end of the rod section 87 protruding through the trunnion. A hole 95 is formed in one side of the inner tube 27 to provide access to the adjusting spacer 89, and the effective length of the unlocking bar 59 is adjusted by holding the spacer 89 and turning the rod section 87 with a screwdriver, or vice versa.

As shown in FIG. 1, the steering column assembly is shown in solid lines in its inwardmost position of adjustment, with one end 34 of slot 32 against the head of bolt 26. The outwardmost position is represented by the broken outline of support member 31, wherein the opposite end 38 of slot 32 will be in contact with the head of bolt 26.

As discussed above, the inner tube 27 is normally locked to the outer tube 25 by means of spring 51 acting between the lug 53 and the arm 77 to pull the wedge member 37 up the bearing surface 41. When a new position is desired, the actuating lever 71 is rotated clockwise as shown in FIG. 1, thus rotating the release arm assembly 61 clockwise. When the release arm assembly 61 rotates clockwise the unlocking bar 59 is moved to the left, sliding the wedge member 37 down the bearing surface 41, against the force of spring 51, drawing the adjacent surfaces 43 and 45 of the wedge member away from corresponding surfaces 47 and 49 of the outer tube 25, and allowing the inner tube 27 to slide freely within the outer tube 25. With the lever 71 held in its clockwise-rotated position, the steering column is moved to its desired position, and the lever 71 is released, thereby allowing the spring 51 to again draw the wedge member 37 up the bearing surface 41 to lock the inner and outer tubes together in that position.

To permit the arm 71 to be positioned in its most desirable angular position with respect to the sterring column, the adjusting spacer 89, which is accessible through the hole 95 when the inner tube 27 is moved outward relative to the outer tube 25, is provided to adjust the effective length of the bar 59, as described above.

Figure 5:
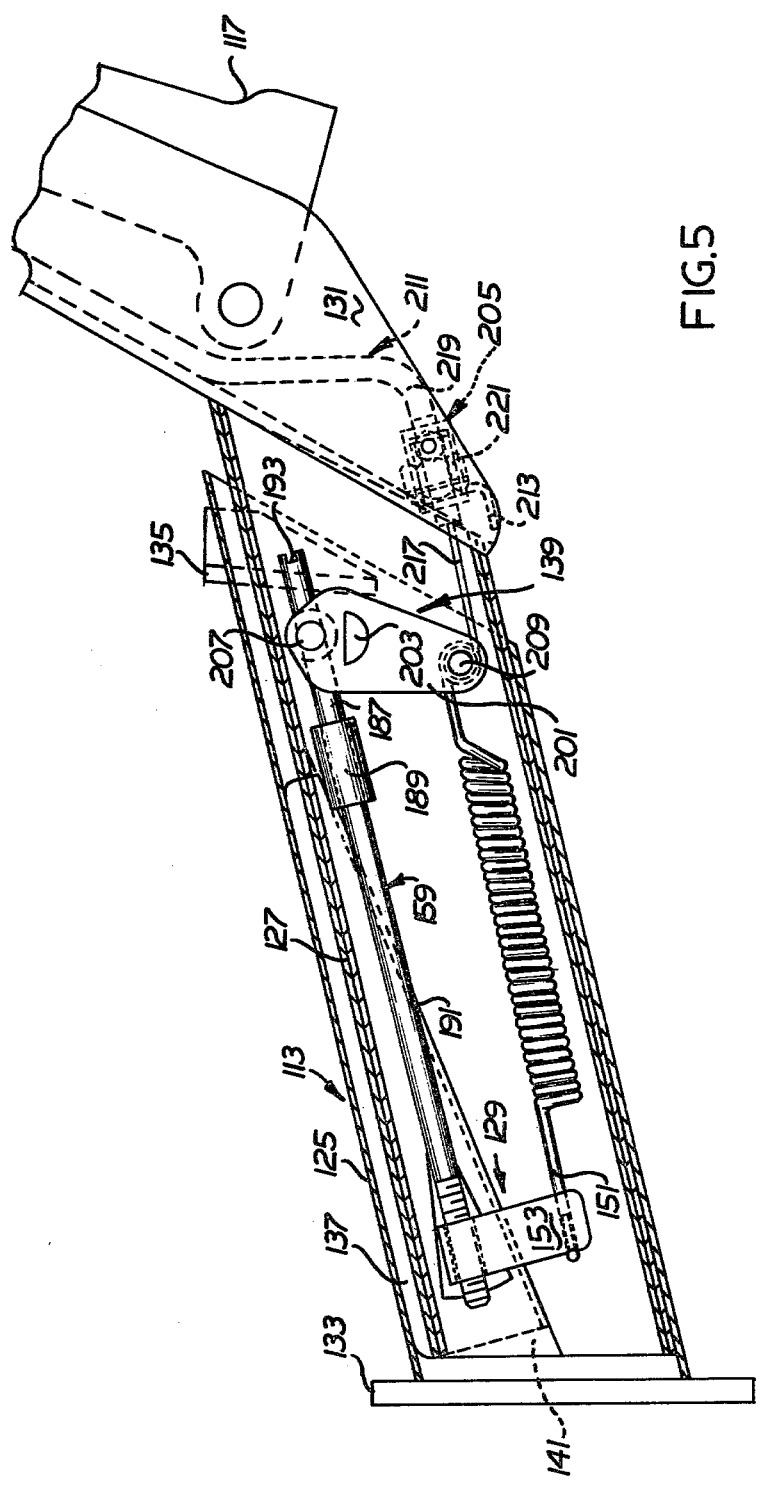
FIG. 5 is a side elevation view of an alternative embodiment of the invention with parts cut away for clarity.
Figure 6:
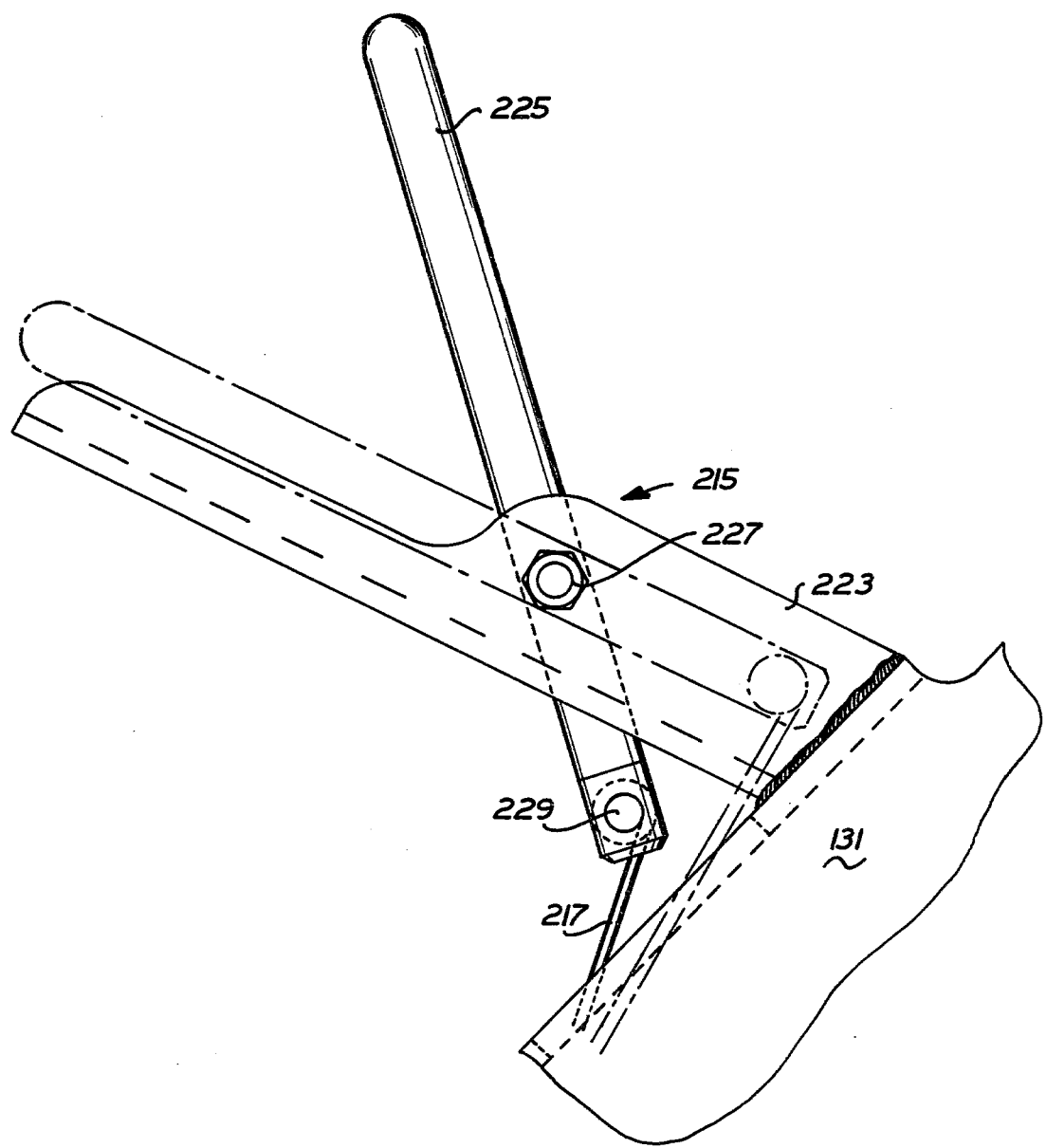
FIG. 6 is an elevation view of a lock release mechanism associated with the embodiment of FIG. 5, on a somewhat larger scale.

FIGS. 5 and 6 illustrate an alternative embodiment of the invention using the same wedge locking principle, but a somewhat different form of wedge release assembly. Where elements of this embodiment are essentially identical to elements of the FIG. 1 to FIG. 4 embodiment the reference numerals will include the same last two digits, but 100 numbers higher.

Referring to FIG. 5, the support assembly 113 is illustrated with the near walls of the inner and outer tubes cut away to better illustrate interior details.

As in the above embodiment, the outer tube 125 and inner tube 127 are locked together by means of a wedge member 137 being drawn up a bearing surface 141 by a spring 151 acting between a lug 153 formed on the wedge member and a wedge release assembly 139. The wedge release assembly 139 comprises a release arm 201, which is received on a "D"-shaped section of a shaft 203 journaled in the inner tube 127, and a cable release assembly 205, which will be described in further detail below.

One end section 187 of unlocking bar 159 is threadedly received in a trunnion 207 rotatably received in release arm 201, above the shaft 203, and the other section 191 is threaded into the lug 153. An adjusting spacer 189 and a screw slot 193 are provided as in the above embodiment. The opposite end of the spring 151 is attached to a rod 209, which can be fixed to the arm 201, below the shaft 203.

The cable release assembly 205 comprises a cable assembly 211, a cable anchor bracket 213 attached to the lower end of support member 131, and a release lever assembly 215 attached to the upper end of the support member 131.

The cable assembly 211 can be a common, commercially available actuating cable assembly, and will not be described herein in detail. The assembly essentially comprises a cable 217 attached at one end to the rod 209, and at the other end to the release lever assembly 215. A flexible sheath 219 surrounds a portion of the cable 217, and is retained by a cable end assembly 221 attached to the anchor bracket 213.

Referring to FIG. 6 the release lever assembly 215 comprises a frame member 223 welded or otherwise attached to the support member 131, and an actuating lever 225 pivotally mounted on the frame member 223. The frame member 223 is a "C"-shaped member opening upward as shown in FIG. 6, and the lever 225 is received between the arms of the "C" and pivotally attached thereto by means of a bolt 227. A portion of the back of the frame member 223 is cut away to permit the inner end of the lever to pass through. The lever 225 is shown in full line in its locked position, wherein the outer tube 125 and the inner tube 127 are locked together by the wedge member 137. The inner end of the lever 225 is formed into a clevis receiving a pin 229 to which the upper end of the cable 217 is attached.

To move the wedge member 137 down the bearing surface 141 to unlock the inner and outer tubes, the lever 225 is rotated counterclockwise as shown in FIG. 6, to its broken line position, thus pulling the lower end of the cable 217 to the right as shown in FIG. 5. Movement of the cable to the right in turn rotates the arm 201 counterclockwise about the axis of shaft 203 and moves the unlocking bar 159 to the left, sliding the wedge member 137 down the bearing surface 141.

When the lever 225 is released, the spring 151 will cause the wedge member 137 to return up the bearing surface 141 to clamp the inner and outer tubes together, and the lever 225 will return to the full line position of FIG. 6.

I claim:

1. In a positioning device for a steering column of a vehicle, the positioning device including a stationary tube member attached to the vehicle and a movable tube member telescopically mounted within the stationary tube member and fixed to the steering column, and a wedge member movable along said movable tube between a first position wherein said wedge member is out of engagement with said stationary tube and a second position wherein said wedge member is in engagement with said stationary tube; the improvement wherein said movable and stationary tube members are substantially rectangular in cross section, said wedge member is in the form of a tetrahedron, and said movable tube member has a bearing surface formed at one corner thereof of a shape complimentary to one side of said tetrahedral wedge member, said wedge member being movable along said movable tube member with one side of said wedge member in contact with said bearing surface.

2. Apparatus as claimed in claim 1, in which said bearing surface is in the form of an elongated triangle with its base at the end of said movable tube away from said steering column and its apex extending toward said steering column, and said wedge member is disposed in contact with said bearing surface with its apex aligned with the apex of said triangular bearing surface.

3. Apparatus as claimed in claim 2, including means acting between said wedge member and said movable tube to bias said wedge member toward said second position.

4. Apparatus as claimed in claim 3, including means operatively connected to said wedge member for selectively moving said wedge member from said second position to said first position.

5. Apparatus as claimed in claim 4, in which said means for selectively moving said wedge member comprises a rod attached at one end to said wedge member, and means attached to the other end of said rod for imparting linear motion to said rod along the longitudinal axes of said tube members.

6. Apparatus as claimed in claim 5, in which said means imparting linear motion to said rod comprises a crank arm pivotally mounted on said movable tube, means attaching said other end of said rod to said crank arm, and hand engageable means for rotating said crank arm.

7. Apparatus as claimed in claim 6 in which said biasing means comprises an extension spring having one end connected to said wedge member and the other end connected to said crank arm.

8. Apparatus as claimed in claim 6, including adjustment means operatively connected to said rod for varying the effective length of said rod.

9. Apparatus as claimed in claim 5, in which said means imparting linear motion to said rod comprises a crank arm pivotally mounted on said movable tube, means attaching said other end of said rod to said crank arm, and cable means attached to said crank arm in position to rotate said crank arm in response to linear movement of said cable means.

10. Apparatus as claimed in claim 9, including hand lever means operatively connected to said cable means.

* * * * *